United States Patent [19]
Yoshioka

[11] 4,344,026
[45] Aug. 10, 1982

[54] STATIC SCHERBIUS SYSTEM

[75] Inventor: Takayuki Yoshioka, Hitachi, Japan

[73] Assignee: Hitachi, Ltd., Tokyo, Japan

[21] Appl. No.: 240,558

[22] Filed: Mar. 4, 1981

[30] Foreign Application Priority Data

Mar. 5, 1980 [JP] Japan .................................. 55/26648

[51] Int. Cl.³ ........................................... H02M 1/18
[52] U.S. Cl. ....................................... 318/806; 363/57
[58] Field of Search .................... 318/806, 812, 798; 363/54, 57, 58

[56] References Cited

U.S. PATENT DOCUMENTS

| | | | |
|---|---|---|---|
| 3,612,971 | 10/1971 | Blaschke et al. | 318/806 |
| 3,800,198 | 3/1974 | Graf et al. | 318/806 |
| 3,947,748 | 3/1976 | Klein | 363/57 |

Primary Examiner—David Smith, Jr.
Attorney, Agent, or Firm—Craig and Antonelli

[57] ABSTRACT

The secondary voltage of a wound-rotor induction motor is rectified by a multi-phase full-wave rectifier circuit of Gratz connection. An inverter connected to the full-wave rectifier circuit through a DC intermediate circuit regulates the amount of AC voltage fed back to the AC power source thereby controlling the speed of the induction motor. A smoothing reactor is disposed in one of the DC buses of the DC intermediate circuit, with its inverter-side terminal being connected to at least two of the AC-side terminal of the full-wave rectifier circuit through series circuits of a resistor and thyristors. A DC gate signal is applied to the thyristors in the series circuits upon detection of interruption of AC power supply, and application of the DC gate signal is ceased in a predetermined period of time after recovery of the AC power supply voltage. The system of simple structure can thus prevent commutation failure of the inverter even when the supply of the AC power supply voltage is interrupted momentarily.

5 Claims, 6 Drawing Figures

STATIC SCHERBIUS SYSTEM

BACKGROUND OF THE INVENTION

1. Field of the Invention

This invention relates to a static Scherbius system which controls the speed of a wound-rotor induction motor, and more particularly to a static Scherbius system which prevents damage to a rectifier and an inverter and prevents also failure of commutation by the inverter due to an overvoltage appearing at the instant of recovery of the AC power supply voltage after sudden momentary service interruption.

2. Description of the Prior Art

As is well known, a static Scherbius system has the advantage that it can effectively control the speed of an induction motor with high operation efficiency, and because of this advantage, the Scherbius system is widely used for the speed control of a motor such as that driving a pump.

The inverter used in the static Scherbius system is a so-called separately excited inverter which makes commutation utilizing the AC power supply voltage, and such an inverter fails to commute current and is rendered inoperative or disabled when the AC power supply voltage is subject to an unusual drop due to, for example, sudden momentary service interruption. Thus, when the load driven under control of the static Scherbius system is a water distributing pump in a water purification plant, the service interruption gives rise to a serious situation which is suspension of water supply.

Further, at the instant of recovery of the AC power supply voltage from the unusually low level to the normal level, a transient voltage or overvoltage corresponding to the condition slip $s=1$ is induced in the secondary winding of the induction motor driving the pump. The rectifier and inverter will be destroyed by the transient voltage of overvoltage level, or a current of value exceeding the commutation ability of the inverter will be supplied to the inverter, and the inverter will fail to perform its function of commutation.

A German patent application laid-open No. 2018025 entitled "Untersynchrone Stromrichterkaskade" has been proposed in an effort to suppress such a transient voltage induced at the instant of recovery of an AC power supply voltage subjected to an unusual drop due to sudden momentary service interruption. According to this German patent, a thyristor and a resistor are connected in series between DC buses of a DC intermediate circuit connecting the rectifier to the inverter, and appearance of an overvoltage is detected to turn on the thyristor so as to suppress the overvoltage by the resistor.

Due to, however, the fact that the thyristor is connected between the DC buses of the DC intermediate circuit in the cited German patent application, an extinction circuit is inevitably required so as to turn off the thyristor as soon as the AC power supply is recovered. Such an extinction circuit includes an extinction-purpose power source (for example, a capacitor), an extinction-purpose thyristor and a firing circuit for firing the extinction-purpose thyristor. A static Ward-Leonard system including such as extinction circuit is expensive.

Further, in the cited German patent, the thyristor is turned on after detection of appearance of the overvoltage. Therefore, the proposed system has such an additional defect that the protecting function is not fully reliable since there are various response delays including delayed detection of the overvoltage and delayed firing of the thyristor.

SUMMARY OF THE INVENTION

It is a primary object of the present invention to provide a novel and improved static Scherbius system which can reliably suppress an overvoltage occurring at the instant of recovery of the AC power supply voltage after sudden momentary interruption of AC power supply, although the system is relatively simple in structure and is therefore inexpensive.

The present invention is featured by the fact that thyristors connected in series with a resistor are connected between at least two AC-side terminals of a multi-phase full-wave rectifier circuit rectifying secondary voltage of an induction motor and an inverter-side terminal of a smoothing reactor, and the thyristors are turned on upon sudden momentary interruption of AC power supply and are turned off in a predetermined period of time after recovery of the AC power supply voltage after the service interruption.

Other objects, features and advantages of the present invention will become apparent from the following detailed description taken in conjunction with the accompanying drawings.

DESCRIPTION OF THE PREFERRED EMBODIMENTS

Figure 1:
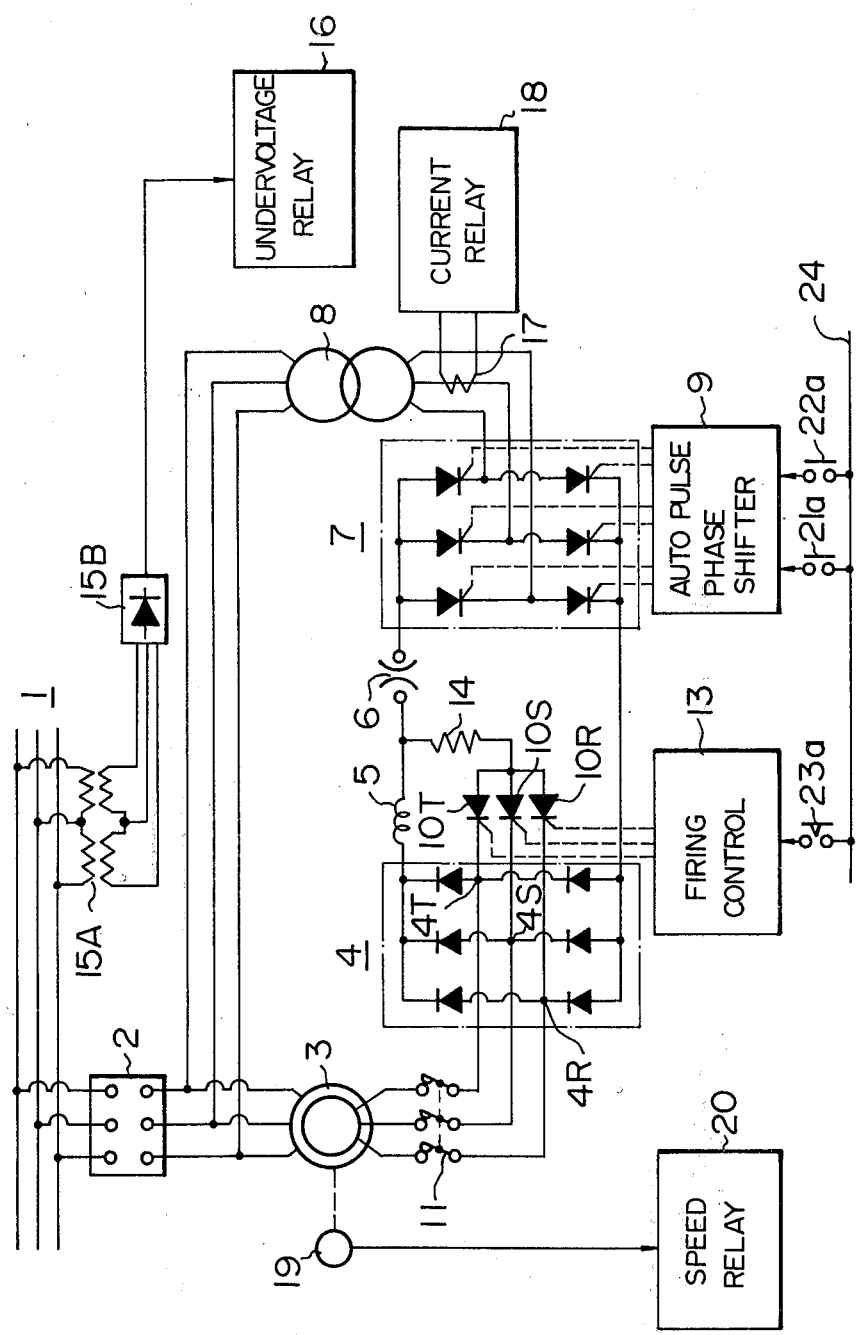
FIG. 1 is a circuit diagram showing the structure of an embodiment of the present invention.

FIG. 1 is a circuit diagram showing the structure of an embodiment of the static Ward-Leonard system according to the present invention.

Referring to FIG. 1, a wound-rotor induction motor 3 is connected at its primary side to AC power supply buses 1 through a circuit breaker 2. A tachogenerator 19 is directly coupled to the motor 3, and its output signal indicative of the detected motor speed is applied to a speed relay 20 which is energized when the motor speed exceeds a predetermined setting. The motor 3 is connected at its secondary side to a three-phase full-wave rectifier circuit 4 of Gratz connection through a contactor 11, and the full-wave rectifier circuit 4 is connected at its DC-side to an inverter 7 through a DC intermediate circuit including a smoothing reactor 5 and a high-speed circuit breaker 6. The inverter 7 is connected at its AC-side terminals to the primary side of the motor 3 through a transformer 8, and the firing angle of the inverter 7 is controlled by an automatic pulse phase shifter 9. The terminal of the smoothing reactor 5 connected to the high-speed circuit breaker 6 is also connected through a resistor 14 to thyristors 10R, 10S and 10T which are connected to the AC-side terminals 4R, 4S and 4T respectively of the full-wave rectifier circuit 4. The firing angle of the thyristors 10R, 10S and 10T is controlled by a firing control circuit 13. A transformer 15A detects the AC power supply voltage on the AC power supply buses 1, and its output signal indicative of the detected voltage is applied to an undervoltage relay 16 after being rectified by a full-wave rectifier circuit 15B. Another transformer 17 detects the current flowing through the inverter 7, and its output signal indicative of the detected current is applied to a current relay 18. Reference numerals 21a and 22a designate normally-open or make contacts of relays 21 and 22 respectively described later. Reference numeral 23a designates a normally-open or make contact of an instantaneous-operation timed-recovery delay relay 23 described later, and reference numeral 24 designates a control power supply line. The starting rheostat is not shown in FIG. 1.

Figure 2:
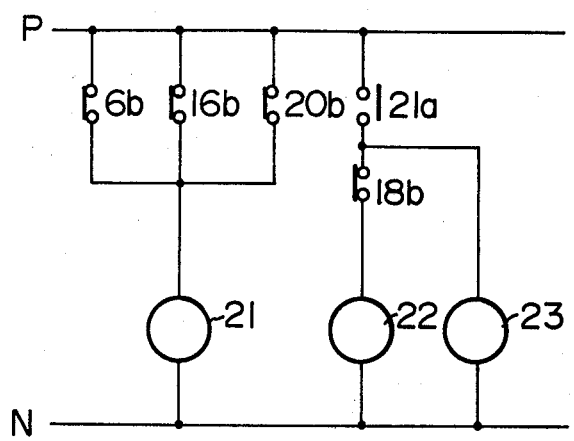
FIG. 2 is a circuit diagram of an actuating circuit therefor.

FIG. 2 shows the structure of an actuating circuit. Referring to FIG. 2, a normally-closed or break contact 6b of the high-speed circuit breaker 6, a normally-closed or break contact 16b of the undervoltage relay 16 and a normally-closed or break contact 20b of the speed relay 20 are connected in parallel with each other, and this parallel circuit and a relay 21 are connected between actuating power supply buses P and N. The make contact 21a of the relay 21, a break contact 18b of the current relay 18 and a relay 22 are connected in series between the buses P and N, and the delay relay 23 determining the timing of ceasing application of the gate signal to the thyristors 10R to 10T is connected across the series connection of the relay contact 18b and the relay 22.

The operation of the system shown in FIG. 1 and the circuit shown in FIG. 2 will be described with reference to FIG. 3.

Suppose now that the induction motor 3 is rotating at a speed $N_1$ under control of the Scherbius system with the high-speed circuit breaker 6 and the contactor 11 being maintained in their closed position. Under this state, the relay 21 is not energized since the break contact 6b of the high-speed circuit breaker 6, the break contact 16b of the undervoltage relay 16 and the break contact 20b of the speed relay 20 are all in their open or off position. The relay 22 and the delay relay 23 are also in their deenergized state since the make contact 21a of the relay 21 is in its open position. Consequently, the relay contacts 21a, 22a and 23a are all in their open position.

Suppose then that supply of the AC power supply voltage $E_1$ is suddenly interrupted at time $t_1$. In response to the sudden service interruption, the undervoltage relay 16 is energized, and its break contact 16b is turned into its closed or on position. Consequently, the relay 21 is energized to close its make contact 21a. In response to the closure of the relay control 21a, a shift command signal is applied to the automatic pulse phase shifter 9 so as to shift the phase control advance angle of the inverter 7 to its minimum value. The delay relay 23 is also energized in response to the closure of the relay contact 21a, and its make contact 23a is closed. In response to the closure of the relay contact 23a, the firing control circuit 13 applies a DC gate signal (a train of consecutive pulses) to the thyristors 10R, 10S and 10T to turn on the same. Since the thyristors 10R, 10S and 10T are now turned on, the current output of sustained level from the smoothing reactor 5 is distributed to the thyristors 10R, 10S and 10T, so that the shifting operation above described causes an abrupt decrease of the current Iv flowing through the inverter 7 until the current Iv decreases to its zero level at time $t_2$. Therefore, at time $t_2$, the current relay 18 is deenergized to close its break contact 18b. In response to the closure of the relay contact 18b, the relay 22 is energized to close its make contact 22a. In response to the closure of the relay contact 22a, the automatic pulses phase shifter 9 acts to block application of firing pulses to the inverter 7. The inverter 7 is therefore rendered inoperative. Such a situation continues until the AC power supply voltage $E_1$ on the AC power supply buses 1 is recovered, while the motor speed N decreases as shown in FIG. 3.

Suppose then that the source of service interruption is remedied and the power supply voltage $E_1$ is recovered at time $t_3$. Since the thyristors 10R, 10S and 10T are still in their on position at this time $t_3$, the secondary current of the motor 3 flows through the route which is traced from the secondary winding of the motor 3—the diodes disposed at the negative side of the full-wave rectifier circuit 4—the smoothing reactor 5—the resistor 14 to the thyristors 10R, 10S, 10T. Therefore, an overvoltage which may occur at the instant of recovery of the AC power supply voltage after the sudden service interruption is fully suppressed, and the motor 3 is accelerated. The speed N of the motor 3 starts to increase from time $t_3$ as seen in FIG. 3. When the motor speed N attains its predetermined setting Ns at time $t_4$, the speed relay 20 is energized to open its break contact 20b. The speed setting Ns is selected to be, for example, the minimum value of the Scherbius speed control range. The high-speed circuit breaker 6 is not tripped so long as the service interruption is momentary, and its break contact 6b remains in its open position. The undervoltage relay 16 is deenergized at time $t_3$ to open its break contact 16b. Consequently, in response to the opening of the relay contact 20b, the relay 21 is deenergized to open its make contact 21a. In response to the off position of the relay contact 21a, the relay 22 is deenergized to open its make contact 22a. When the relay contacts 21a and 22a are thus placed in their off position, the automatic pulse phase shifter 9 is released from its advance angle shifting and pulse application blocking function and carries out its firing control function on the inverter 7. In this case, the thyristors 10R, 10S and 10T are still maintained in their on state since the make contact 23a of the delay relay 23 is kept in its on position for a predetermined timed duration Td in spite of the fact that the relay contact 21a has been opened. The thyristors 10R, 10S and 10T are kept in their on state for such an additional period of time Td so that the speed N of the motor 3 may not decrease until the operation of the inverter 7 is stabilized. After the limited period of time Td, the make contact 23a of the delay relay 23 is opened at time $t_5$. As soon as the relay contact 23a is placed in its off position at time $t_5$, the firing control circuit 13 ceases to apply the gate pulses to the thyristors 10R, 10S and 10T.

How the thyristors 10R, 10S and 10T are turned off in response to the disappearance of the gate pulses applied thereto from the firing control circuit 13 will be described with reference to FIG. 4.

Figure 4:
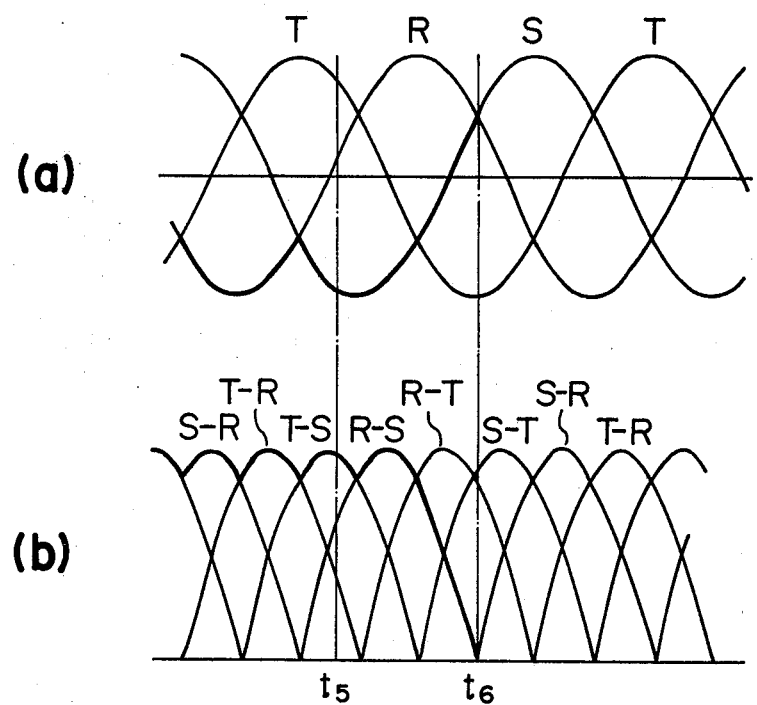
FIGS. 3 and 4 are a time chart and a waveform diagram respectively to illustrate the operation of the embodiment.

Suppose now that the application of the gate pulses to the thyristors 10R, 10S and 10T is ceased at time $t_5$ at which the voltages at the AC-side terminals 4R, 4S and 4T of the full-wave rectifier circuit 4, hence, the secondary voltages R, S and T of the motor 3 have respective levels as shown in (a) of FIG. 4. The thyristor 10S is conducting until time immediately before time $t_5$. Therefore, the potential at the anode of the thyristors 10R to 10T becomes gradually higher from the level equal to that at the terminal 4S, as shown by the thick curve in (a) of FIG. 4. Then, when the voltage at the terminal 4S becomes equal to that at the terminal 4R at time $t_6$, the thyristor 10S is turned off. Thus, the thyristors 10R to 10T are automatically turned off by the secondary voltage of the motor 3 when application of the gate pulses from the firing control circuit 13 to the thyristors 10R to 10T is ceased.

Figure 3:
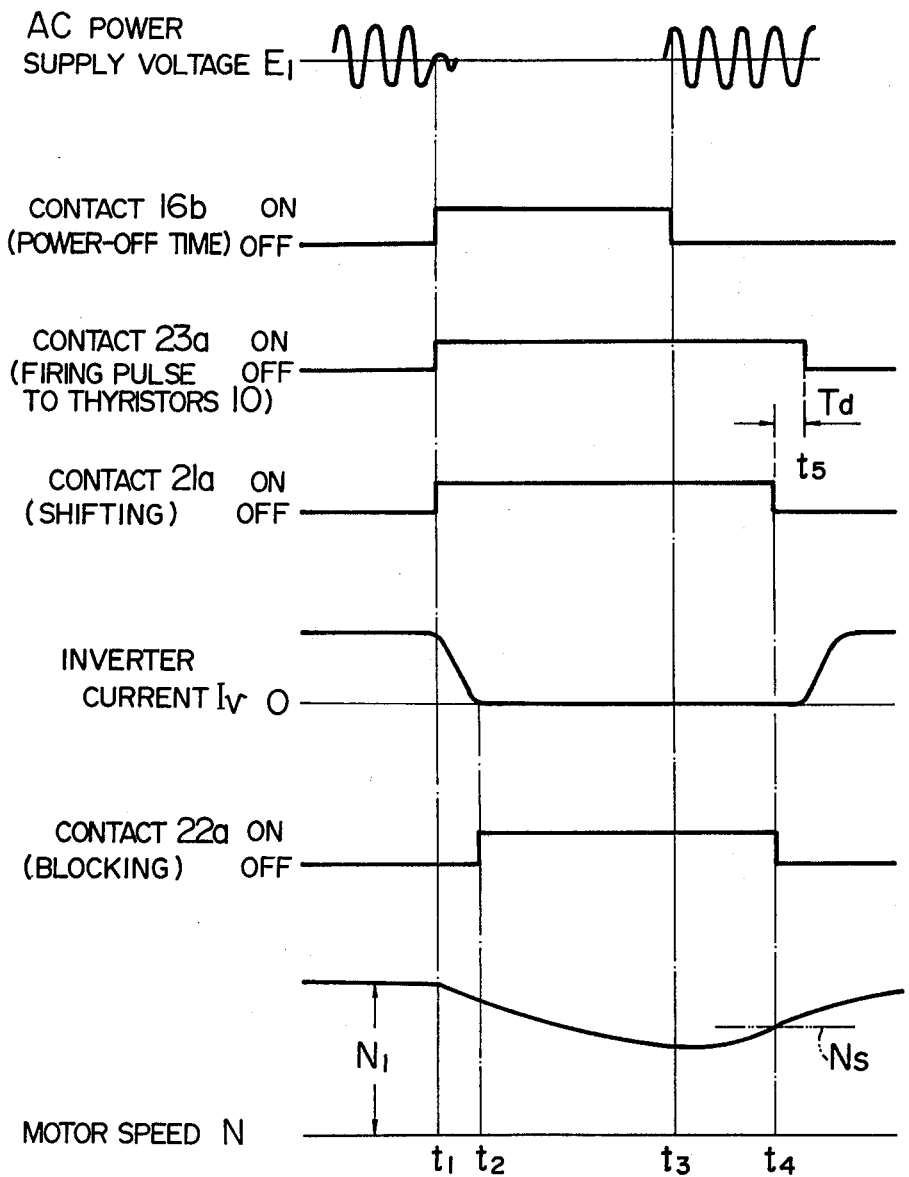

Further, due to the fact that the voltage applied across the resistor 14, when the thyristors 10R to 10T are turned off, decreases gradually as shown by the thick curve in (b) of FIG. 4, the current Iv flowing through the inverter 7 increases also gradually as shown in FIG. 3. This gradual increase of the current Iv flowing through the inverter 7 means the fact that the current flowing through the smoothing reactor 5 does not change abruptly. It is therefore possible to prevent an overvoltage from being induced in the smoothing reactor 5.

By turning off the thyristors 10R to 10T in the manner above described, the Scherbius system is restored to the original state in which it has been placed before the occurrence of sudden service interruption, so that it can perform the normal Scherbius function. The flow of current through the inverter 7 energizes the current relay 18, and its break contact 18b is opened.

In the event of failure of commutation by the inverter 7, an overcurrent may appear to trip the high-speed circuit breaker 6. However, the high-speed circuit breaker 6 is automatically restored from its tripped position or reclosed by means of an automatic reclosing unit (not shown) commonly provided for this purpose. In response to the reclosure of the high-speed circuit breaker 6, the relay 21 is deenergized when both of the break contact 16b of the undervoltage relay 16 and the break contact 20b of the speed relay 20 are kept in their off position, so that the Scherbius function can be performed after the steps above described.

The speed of the induction motor 3 can be controlled in the manner above described. It can be seen that, according to the present invention, an overvoltage occurring at the instant of recovery of the AC power supply voltage after momentary service interruption can be completely suppressed to reliably prevent failure of commutation by the inverter 7 by merely connecting series circuits of a resistor 14 and thyristors 10R to 10T between the AC input terminals of the full-wave rectifier circuit 4 and the terminal of the smoothing reactor 5 connected to the inverter 7. Therefore, an undesirable overvoltage resulting recovery of the AC power supply voltage after from sudden momentary service interruption can be completely suppressed by a simple arrangement without the necessity for provision of a thyristor extinction circuit.

In the embodiment shown in FIG. 1, a single resistor 14 is connected between the inverter-side terminal of the smoothing reactor 5 and the thyristors 10R to 10T connected to the AC-side terminals 4R to 4T respectively of the full-wave rectifier circuit 4, so that the structure of the Scherbius system can be correspondingly simplified.

According to the present invention, the induction motor 3 can be started by the resistor 14 without requiring a starting rheostat. Such a mode of operation will be briefly described.

An actuating voltage is applied to the actuating power supply buses P and N in the first step of starting the induction motor 3. Since, at this time, the break contact 20b of the speed relay 20 is in its on position, the relay 21 is energized to close its make contact 21a. In response to the closure of the make contact 21a of the relay 21, the relay 22 is energized to close its make contact 22a since, at this time, the break contact 18b of the current relay 18 is in its on position. When the relay contact 22a is placed in its on position, the automatic pulse phase shifter 9 blocks application of the gate pulses to the inverter 7. On the other hand, in response to the closure of the relay contact 21a, the delay relay 23 is energized to close its make contact 23a, and the firing control circuit 13 applies the gate pulses to the thyristors 10R to 10T. Under such a situation, the circuit breaker 2, contactor 11 and high-speed circuit breaker 6 are turned on. Consequently, the secondary current of the motor 3 flows through the route which is traced from the secondary winding of the motor 3—the diodes disposed at the positive side of the full-wave rectifier circuit 4—the smoothing reactor 5—the resistor 14 to the thyristors 10R to 10T. The motor 3 is started and accelerated. As soon as the speed N of the motor 3 attains the predetermined setting Ns, the speed relay 20 is energized to open its break contact 20b. At this time, the break contact 6b of the high-speed circuit breaker 6 and the break contact 16b of the undervoltage relay 16 are both in the off position. Therefore, as soon as the speed N of the motor 3 attains the predetermined setting Ns, the relay 21 is deenergized to open its make contact 21a thereby deenergizing the relay 22. As soon as the relay contacts 21a and 22a are placed in their off position, the automatic pulse phase shifter 9 is released from its shifting function and its blocking function, and the gate pulses are now applied to the thyristors in the inverter 7, so that the Scherbius function is now performed. After the limited period of time Td, the delay relay 23 is released to open its make contact 23a, and the firing control circuit 13 ceases to apply the gate pulses to the thyristors 10R, 10S and 10T thereby turning off these thyristors 10R to 10T. Thereafter, the usual Scherbius function is performed. It will be seen that the induction motor 3 can be started by such an operation mode too.

Figure 5:
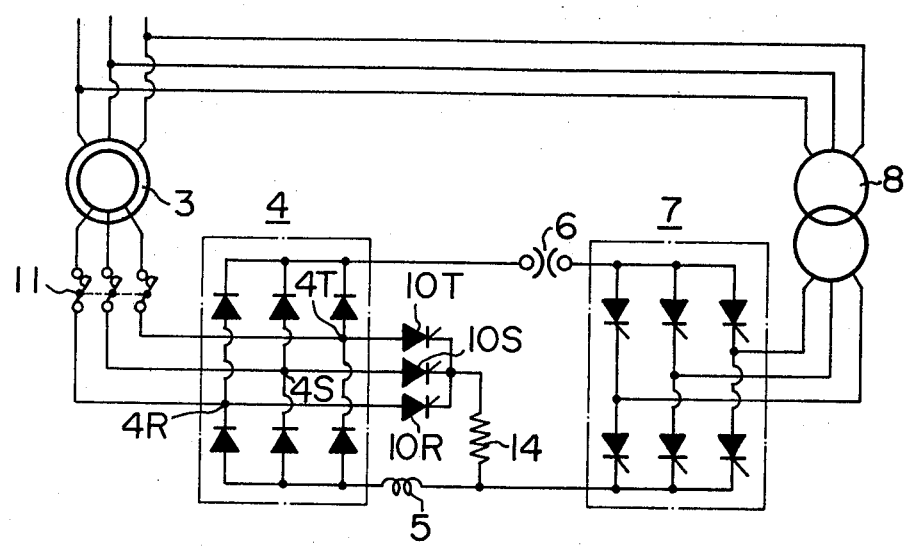
FIGS. 5 and 6 are circuit diagrams showing the structure of other embodiments of the present invention respectively.

FIG. 5 shows another embodiment or a modification of the first embodiment of the present invention shown in FIG. 1. In the modification shown in FIG. 5, the smoothing reactor 5 is inserted in the negative one of the DC output buses of the full-wave rectifier circuit 4. In this case, the AC-side terminals 4R, 4S and 4T of the full-wave rectifier circit 4 are connected to the anode of the thyristors 10R, 10S and 10T respectively. It will be apparent that the operation of the second embodiment shown in FIG. 5 is entirely the same as that of the first embodiment shown in FIG. 1.

In the first and second embodiments above described, all of the AC-side terminals 4R, 4S and 4T of the full-wave rectifier circuit 4 are connected to the inverter-side terminal of the smoothing reactor 5. However, the two terminals among the three of the former may only be connected to the latter.

Figure 6:
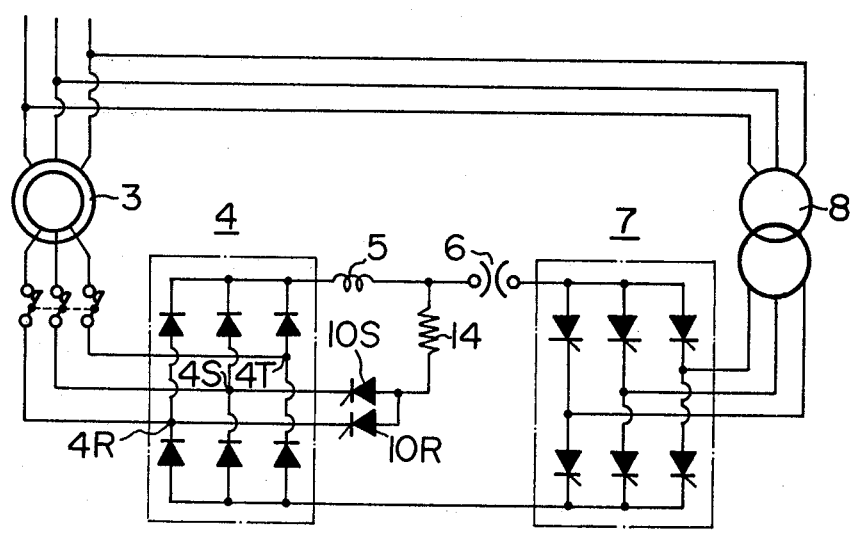

Still another embodiment illustrative of such a modification is shown in FIG. 6. Referring to FIG. 6, the AC-side terminals 4R and 4S of the full-wave rectifier circuit 4 are connected to the inverter-side terminal of the smoothing reactor 5 through the thyristors 10R, 10S and the rectifier 14. The current of sustained level from the smoothing reactor 5 continues to flow through either the thyristor 10R or the thyristor 10S in the event of momentary interruption of AC power supply, and the current Iv flowing through the inverter 7 decreases in a manner similar to that described with reference to the first embodiment of the present invention. Further, the effect of suppressing an overvoltage appearing at the instant of recovery of the AC power supply voltage after service interruption is also entirely similar to that described with reference to the first embodiment.

It will be understood from the foregoing detailed description of the present invention that at least two AC-side terminals of the multi-phase full-wave rectifier circuit are connected to the inverter-side terminal of the smoothing reactor through a simple combination of thyristors and a resistor, so that the current flowing through the inverter in the event of sudden momentary interruption of AC power supply can be decreased quickly, and an undesirable overvoltage appearing at the instant of recovery of the AC power supply voltage after the service interruption can also be suppressed. In the present invention, the thyristors provided for the on-off of the overvoltage suppressing resistor are turned off utilizing the secondary voltage of the induction motor. The present invention is therefore advantageous in that the thyristor extinction circuit is unnecesary, and the number of thyristors can be decreased. Thus, the Scherbius system of simple structure can reliably prevent failure of commutation by the inverter at the instant of recovery of the AC power supply voltage after sudden momentary service interruption.

I claim:
1. A static Scherbius system comprising:
   (a) an induction motor supplied with power from an AC power source;
   (b) a multi-phase full-wave rectifier circuit of Gratz connection for rectifying the secondary voltage of said induction motor;
   (c) an inverter converting the DC output from said full-wave rectifier circuit into an AC equivalent to feed back the same to said AC power source;
   (d) a DC intermediate circuit connecting said full-wave rectifier circuit to said inverter;
   (e) a smoothing reactor disposed in one of DC buses of said DC intermediate circuit for smoothing the direct current;
   (f) at least two series circuits each including series connected resistor means and thyristor means and connected between an inverter-side terminal of said smoothing reactor and at least two of AC-side terminals of said full-wave rectifier circuit;
   (g) service interruption detecting means for detecting service interruption by continuously monitoring the state of the AC power supply voltage of said AC power source; and
   (h) a firing control circuit applying a DC gate signal to said thyristor means upon detection of service interruption by said service interruption detecting means and ceasing application of the DC gate signal in a predetermined period of time after recovery of said AC power supply voltage after the service interruption.

2. A static Scherbius system as claimed in claim 1, wherein a single resistor is used as said resistor means in common for said series circuits.

3. A static Scherbius system as claimed in claim 1, wherein said smoothing reactor is disposed in a positive one of said DC buses of said DC intermediate circuit.

4. A static Scherbius system as claimed in claim 1, wherein said smoothing reactor is disposed in a negative one of said DC buses of said DC intermediate circuit.

5. A static Scherbius system as claimed in claim 1, wherein said predetermined period of time at the end of which said firing control circuit ceases application of the DC gate signal after recovery of said AC power supply voltage is selected to be later than the time at which a secondary transient voltage disappears.

* * * * *